United States Patent [19]
Zheng

[11] Patent Number: 5,213,147
[45] Date of Patent: May 25, 1993

[54] METHOD AND APPARATUS FOR FOLDING AND COLLAPSING OBJECTS SUPPORTED BY FLEXIBLE LOOPS

[76] Inventor: Yu Zheng, 1065 Howard Ave., Covina, Calif. 91722

[21] Appl. No.: 803,331

[22] Filed: Dec. 4, 1993

[51] Int. Cl.⁵ .............................................. B60J 3/00
[52] U.S. Cl. ............................. 160/370.2; 296/37.16; 296/97.7; 296/97.8; 383/72
[58] Field of Search ............ 160/370.2, 127, 128, 160/237, 377, 351, 369, 387, 405; 296/37.16, 97.7, 97.8; 383/72, 74, 75, 76

[56] References Cited
U.S. PATENT DOCUMENTS

| | | | |
|---|---|---|---|
| 3,789,897 | 2/1974 | Saito | 383/75 X |
| 4,815,784 | 3/1989 | Zheng | 160/97.7 |
| 4,862,943 | 9/1989 | Shafia | 160/370.2 |
| 4,988,216 | 1/1991 | Lyman | 383/74 |
| 5,024,262 | 6/1991 | Huang | 160/370.2 |
| 5,035,460 | 7/1991 | Huang | 296/97.7 X |
| 5,116,273 | 5/1992 | Chan | 160/370.2 |

Primary Examiner—David M. Purol
Attorney, Agent, or Firm—Raymond Sun

[57] ABSTRACT

A method and apparatus for folding and collapsing an object incorporating a flexible loop which defines the particular configuration for the object in its expanded configuration. A cable having a central portion defining a handle has two ends passed through an opening at or adjacent a first point of the loop and tied to second and third points of the loop, with the first, second and third points spaced-apart along the loop. The loop may be folded and collapsed by holding the loop at the first point and pulling the handle to urge the second and third points towards the first point such that three concentric loops are formed from the expanded loop about the first point, each having a size smaller than that of the expanded loop, the three concentric loops twisting and folding about the first point to cause the three concentric loops to overlie each other in a collapsed state in which the size of the expanded loop has been substantially reduced.

27 Claims, 11 Drawing Sheets

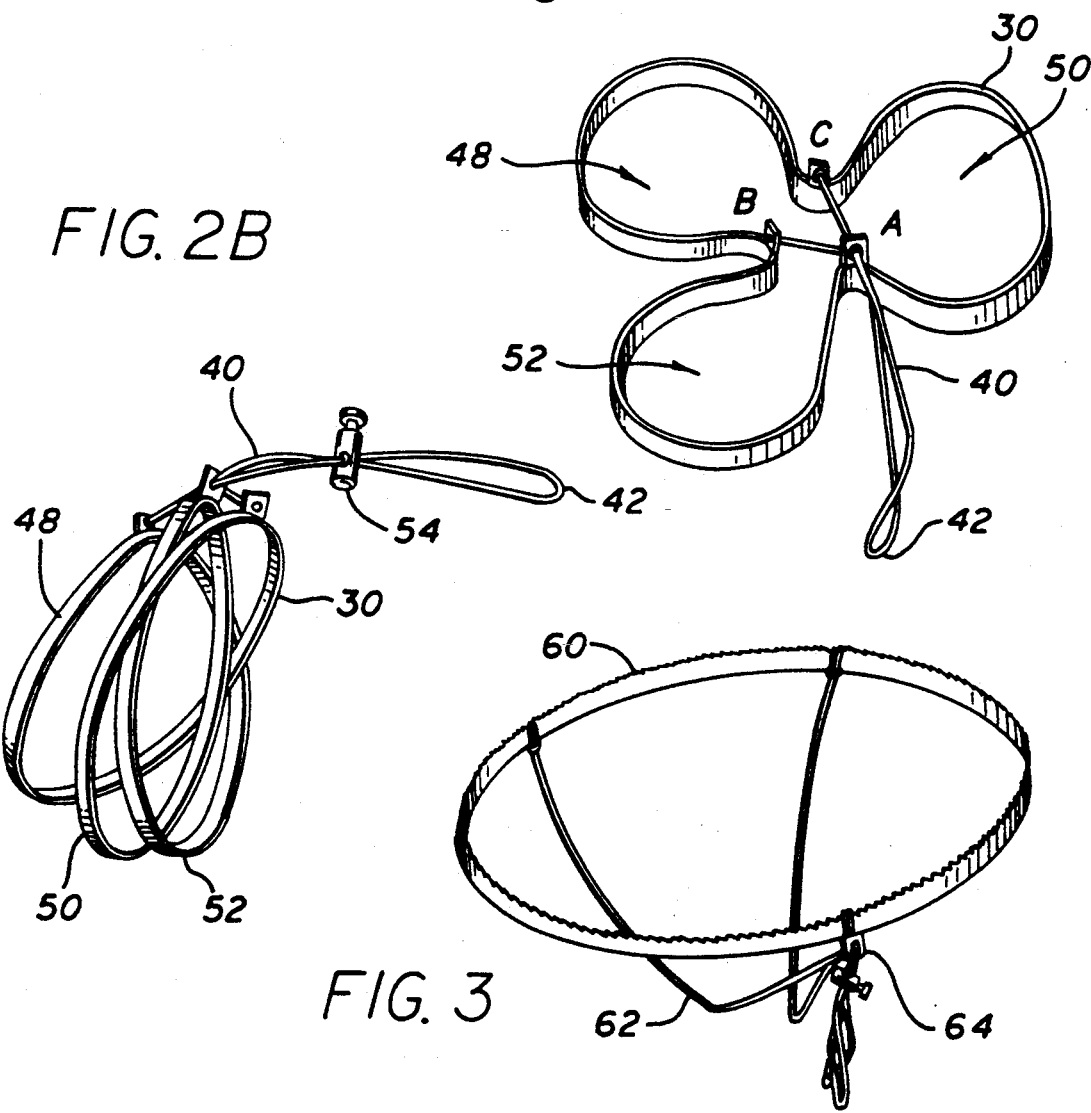

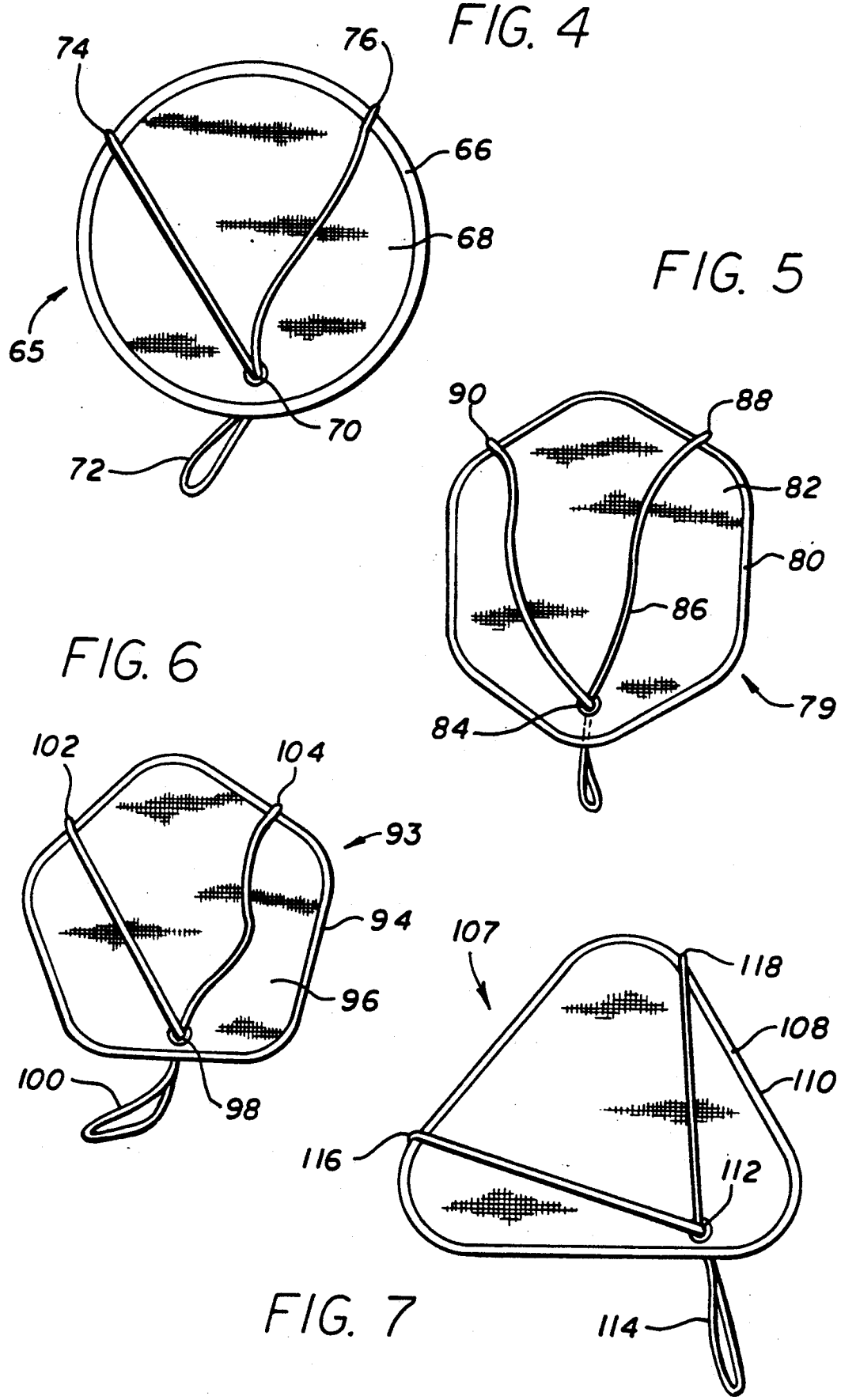

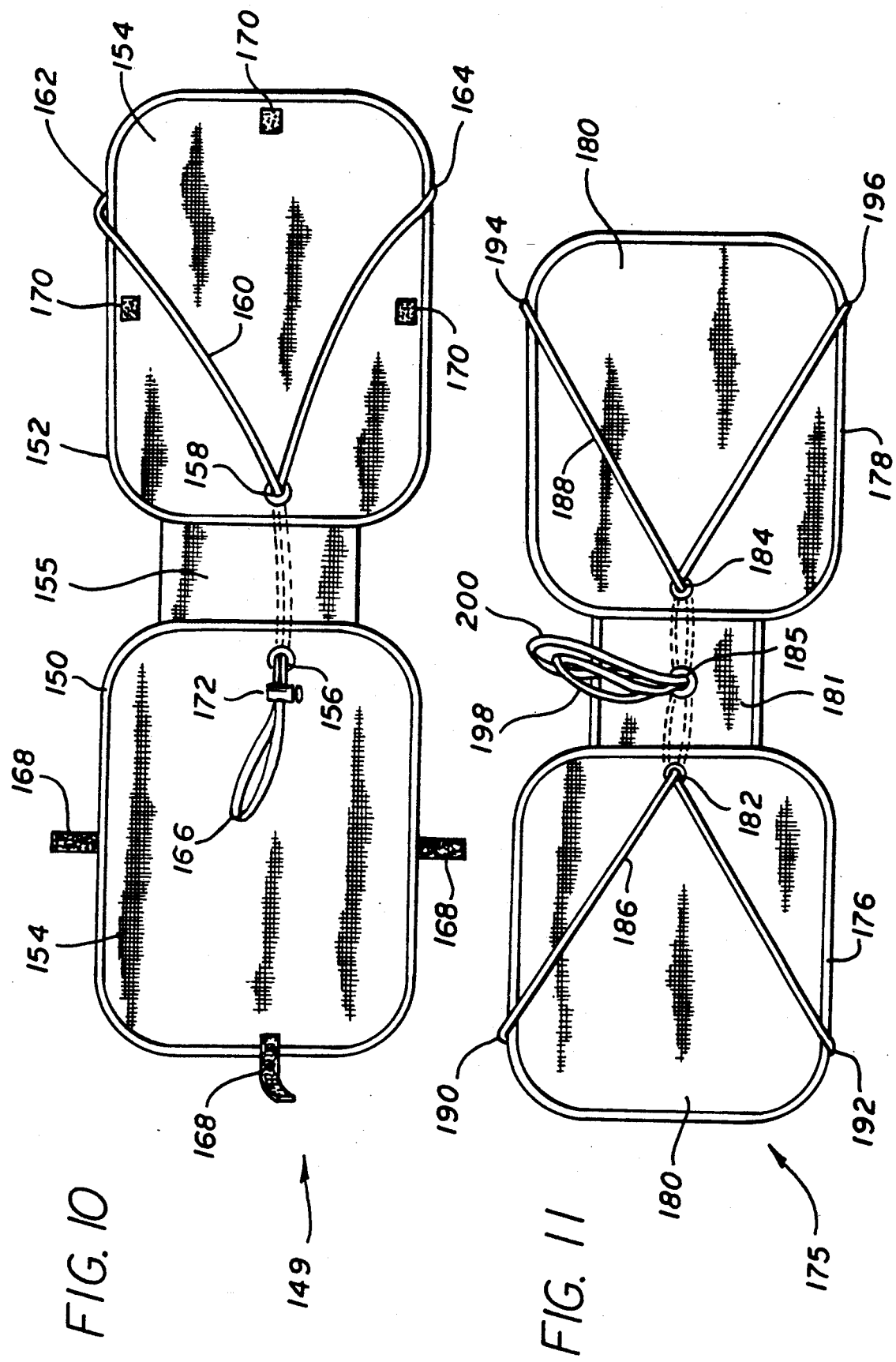

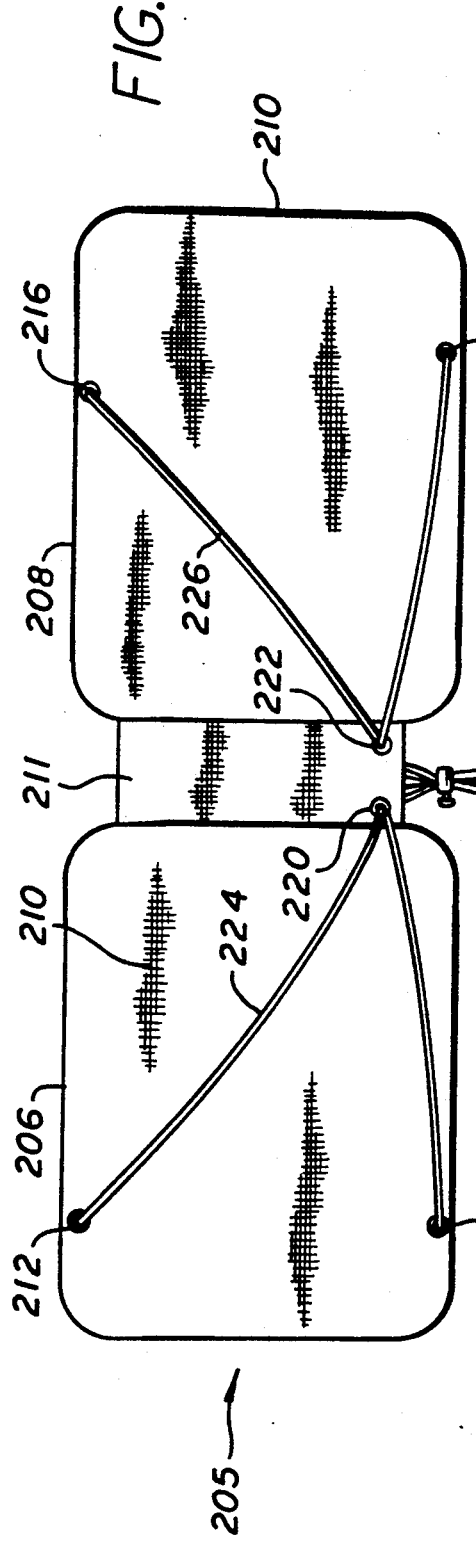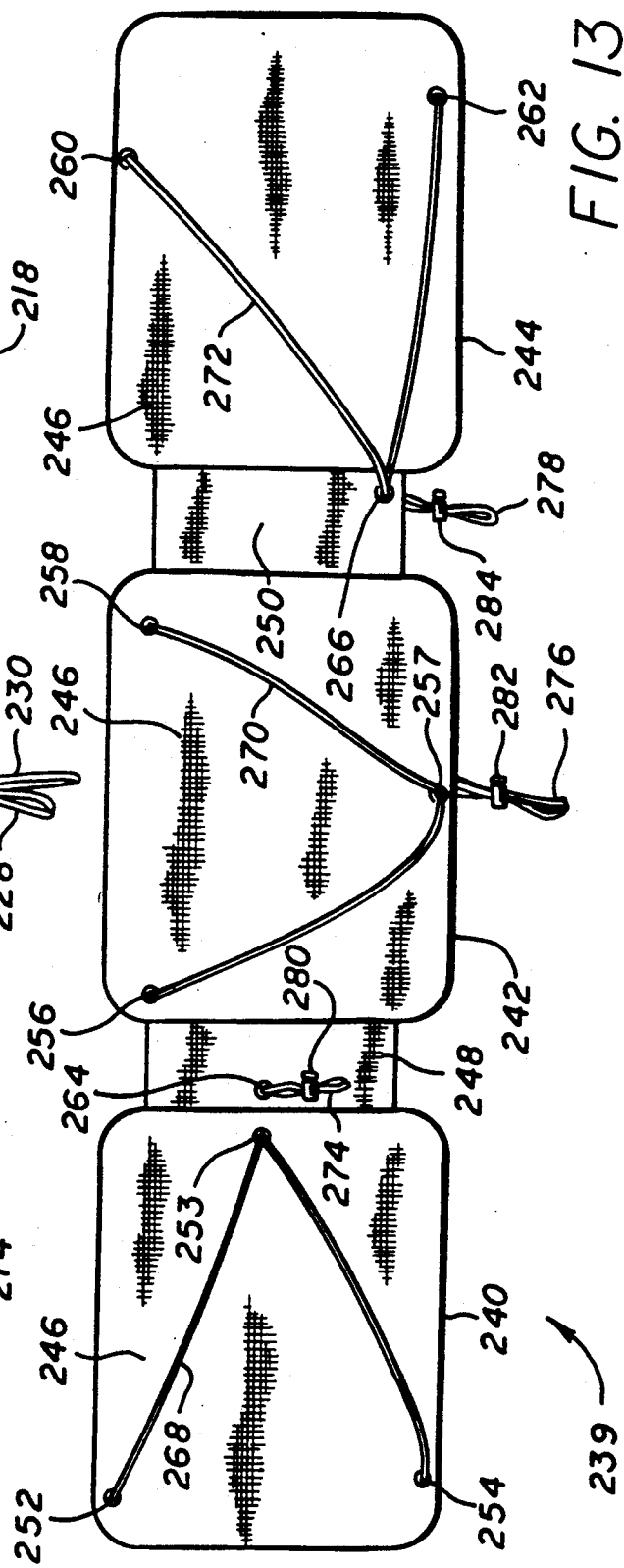

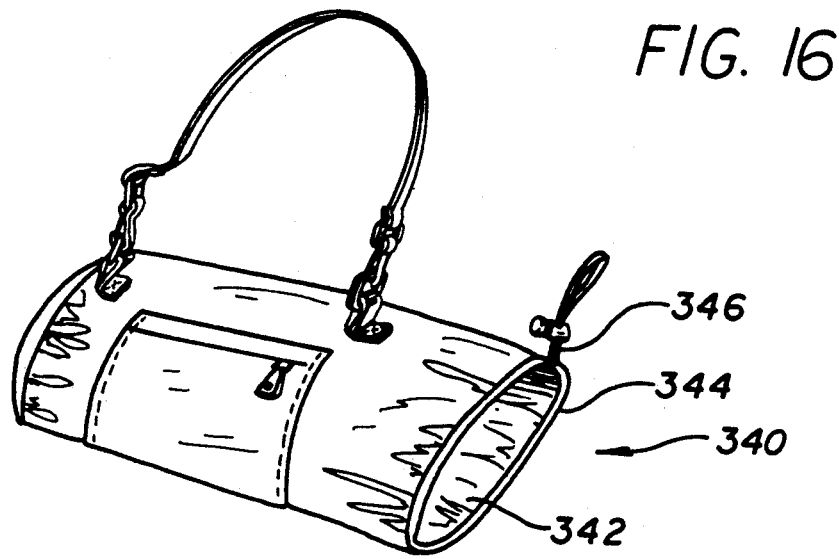
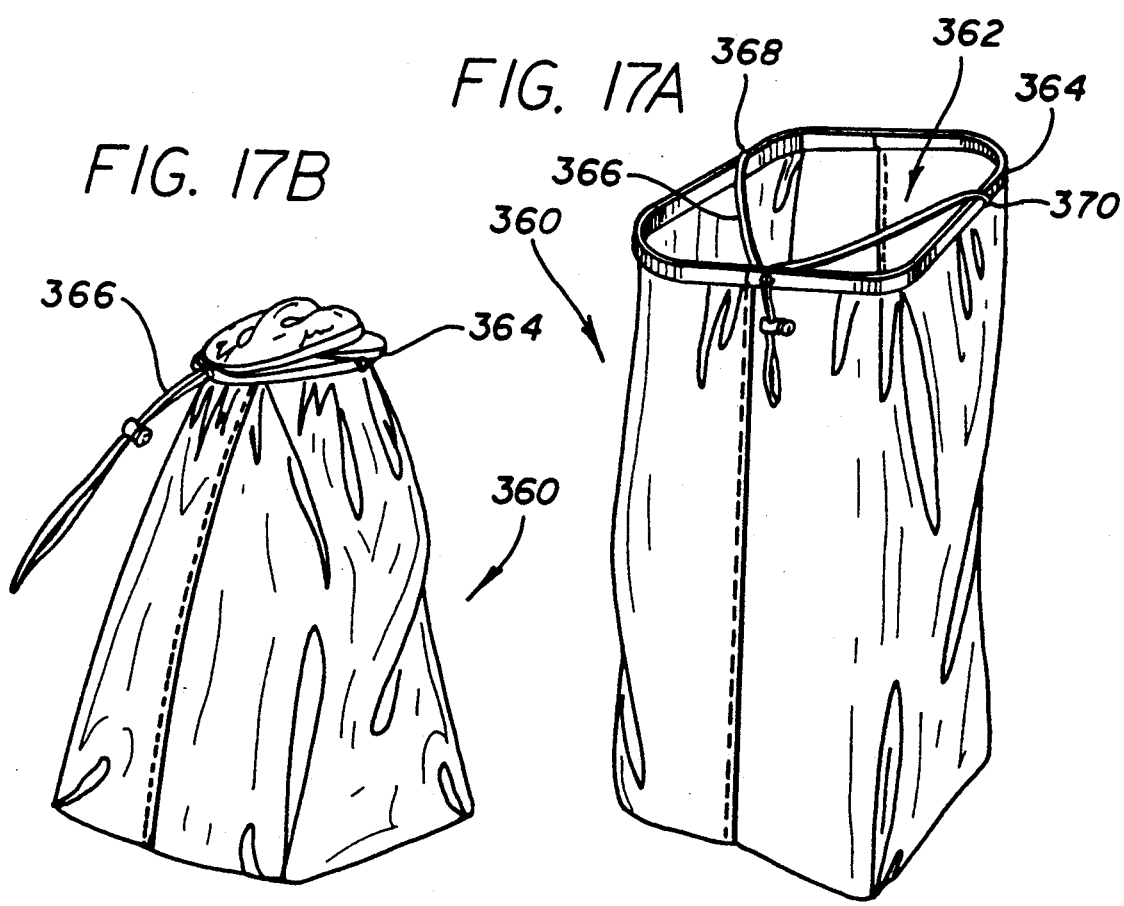

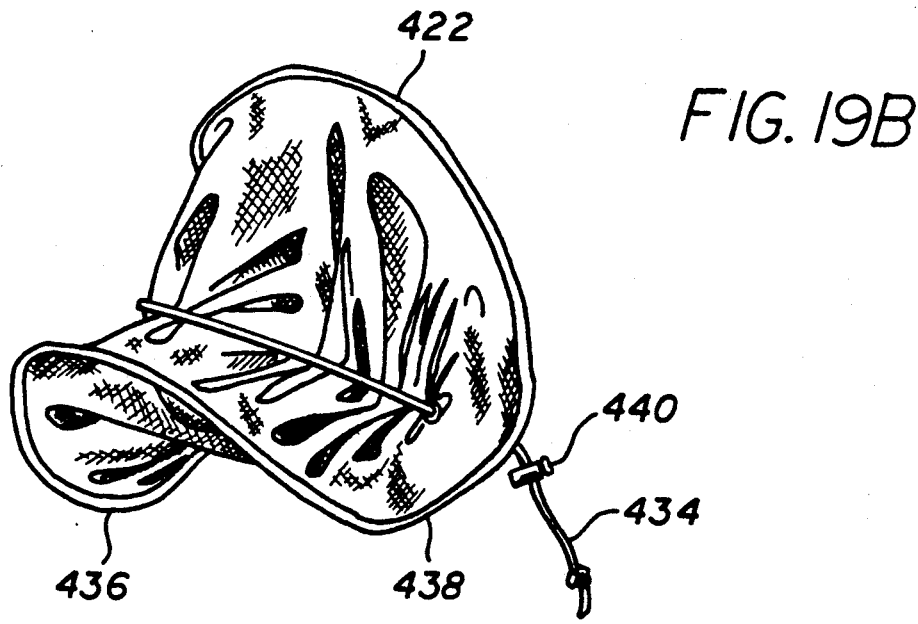
FIG. 19B
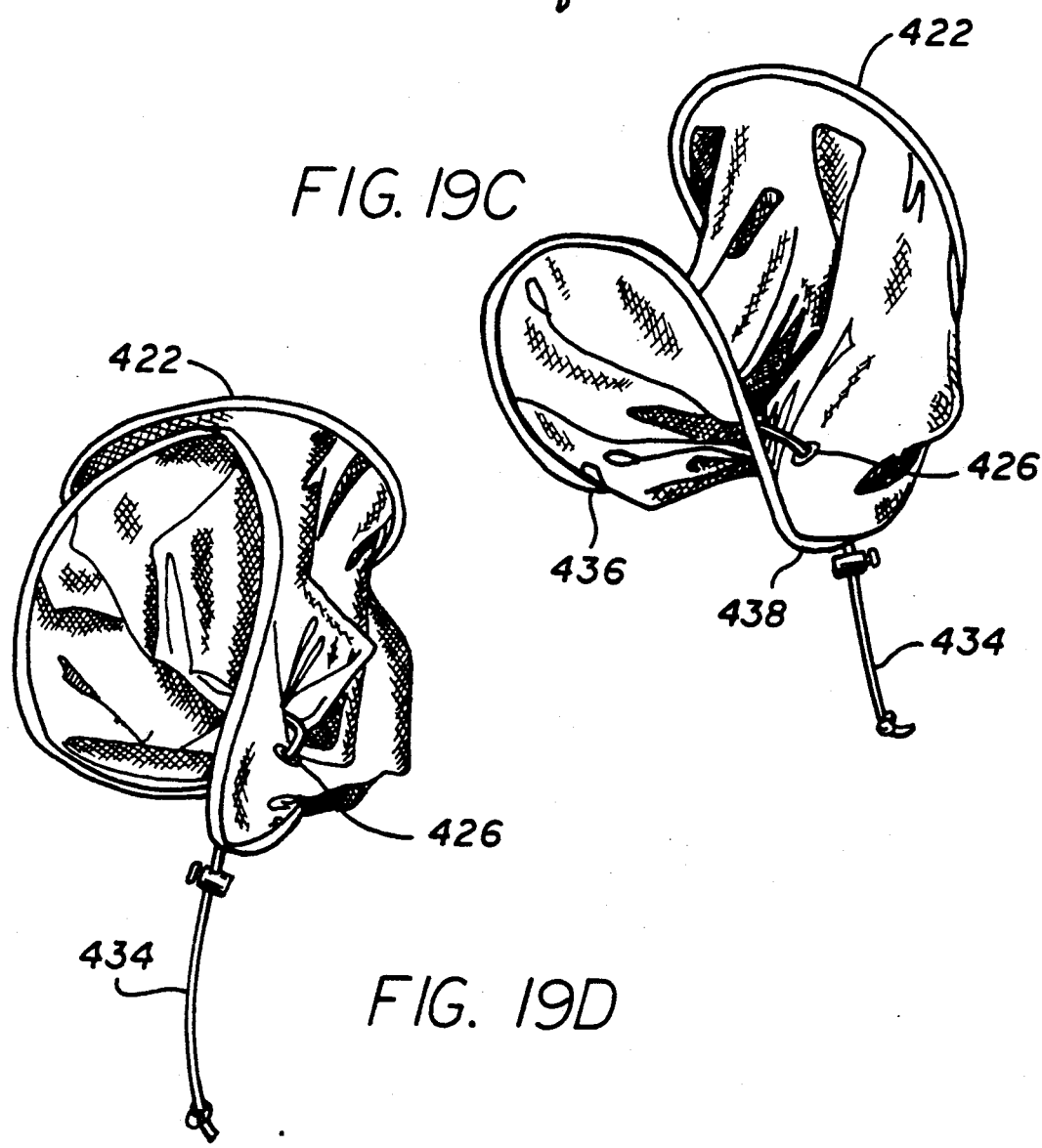
FIG. 19C
FIG. 19D

METHOD AND APPARATUS FOR FOLDING AND COLLAPSING OBJECTS SUPPORTED BY FLEXIBLE LOOPS

BACKGROUND OF THE INVENTION

1. Field of the Invention

The present invention relates to a method and apparatus for folding and collapsing objects supported by flexible loops to obtain a compact folded configuration for convenient storage and transportation.

2. Description of the Prior Art

A number of objects incorporate the use of one or more flexible loops which are made of spring material. One example is a bandsaw, which is made of a flexible steel loop. Other examples include the automobile sunshades shown and described in U.S. Pat. No. 4,815,784 to Zheng and U.S. Pat. No. 5,024,262 to Huang, and the shade structures shown and described in co-pending Ser. No. 07/764,784 to Zheng, filed on Sep. 24, 1991, and entitled "Collapsible Shade Structure", all of which describe shades having one or more flexible loops covered by a fabric material.

The size of such bandsaws and automobile sunshades, for example, may be very large, so that it is desirable to fold and collapse them to obtain a compact configuration which may be stored and transported conveniently. In this regard, U.S. Pat. Nos. 4,815,784 and 5,024,262 and Ser. No. 07/764,784 describe how such sunshades may be manually folded to obtain the desired compact configuration.

However, manually folding and collapsing such loops may be a difficult task for a number of reasons. First, a person attempting to fold such loops for the first time is likely not familiar with the twisting and folding steps that are required to reduce the overall loops to the compact configuration. Even after substantial practice, these steps are not trivial and require care and attention from the person for speedy and successful implementation. Second, the large size of such loops may pose unusual difficulties for persons of smaller physical build. Third, the springy nature of these loops coupled with their large size often pose a safety risk. For example, if the twisting and folding steps are not properly followed, the loops may spring open to their original unfolded configuration, causing potential injury to the person. Further, manually folding some objects, such as a bandsaw, may be prohibitively dangerous because of the size and the sharp edges of the loops.

There is therefore a need for a simple and inexpensive method and apparatus for safely folding objects incorporating flexible loops into smaller concentric loops to obtain a compact folded configuration which may be stored and transported very easily. There is also a need for such a method and apparatus to be easy to implement without any prior user knowledge.

SUMMARY OF THE DISCLOSURE

In order to accomplish the objects of the present invention, a method and apparatus according to embodiments of the present invention are provided for folding and collapsing an object incorporating a flexible loop, the loop having an expanded state and a collapsed state. The loop has an opening provided at or adjacent a first point thereof. A cable having a central portion and two ends is also provided, with a first end of the cable tied to a second point along the loop, and a second end of the cable tied to a third point along the loop, the first, second and third points being spaced apart from each other along the loop. The central portion of the cable is passed through the opening to form a handle.

The object incorporating a flexible loop according to embodiments of the present invention is folded and collapsed by holding the loop at the first point and then pulling the handle, thereby urging the second and third points towards each other at the first point. This causes three concentric loops to be formed from the expanded loop about the first point, each having a size smaller than that of the expanded loop. Thereafter, the three concentric loops are twisted and folded about the first point to cause the three concentric loops to overlie each other in a collapsed state in which the size of the expanded loop has been substantially reduced. The collapsed loop of the object is then secured in the collapsed state.

The method and apparatus according to embodiments of the present invention may be used in a wide variety of actual applications. For example, the method and apparatus according to embodiments of the present invention may be used to fold larger objects into smaller compact configurations which are convenient for storage and transportation. Each of these objects incorporate a flexible loop which provides support to the object and defines the particular configuration of the object. Examples include a bandsaw, shades made of a fabric material covering one or more loops, a station wagon trunk cover, and a camouflage which may be used in military applications. The method and apparatus according to embodiments the present invention may be also used to close or fold openings which are defined by a flexible loop, such as the openings of linen and carry bags.

The embodiments of the present invention provide a simple and inexpensive method and apparatus for safely folding objects, and in particular, larger objects, incorporating flexible loops into smaller concentric loops to obtain a compact collapsed configuration which may be stored and transported very easily. These methods and apparatus are easy to implement and do not require any prior user knowledge.

BRIEF DESCRIPTION OF THE DRAWINGS

Further objects, advantages and features of the invention will become apparent from the detailed description of the preferred embodiments when read in conjunction with the accompanying drawings, in which:

FIGS. 2A and 2B are perspective views illustrating how the flexible loop of FIG. 1 may be folded in accordance with a method of the present invention;

FIG. 3 is a perspective view of a bandsaw which may be folded in accordance with the method of FIGS. 1, 2A and 2B;

FIG. 4 is a front view of a second embodiment of the present invention having a circular loop covered by fabric material;

FIG. 5 is a front view of a third embodiment of the present invention having a six-sided loop covered by fabric material;

FIG. 6 is a front view of a fourth embodiment of the present invention having a five-sided loop covered by fabric material;

FIG. 7 is a front view of a fifth embodiment of the present invention having a three-sided loop covered by fabric material;

FIGS. 10, 11 and 12 are front views of seventh, eighth and ninth embodiments, respectively, of the present invention, each having two four-sided loops covered by fabric material;

FIG. 13 is a front view of a tenth embodiment of the present invention having three four-sided loops all covered by fabric material;

FIG. 16 is a perspective view of an actual application of the present invention in use with an opening of a carry or tote bag, the periphery of the opening made from a flexible loop;

FIGS. 17A and 17B are perspective views of an actual application of the present invention in use with an opening of a linen bag, the periphery of the opening made from a flexible loop;

FIGS. 19B through 19F are perspective views illustrating how the twelfth embodiment of FIG. 19A may be folded in accordance with a method of the present invention;

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles and exemplary embodiments of the invention. The scope of the invention is best defined by the appended claims.

Figure 1:
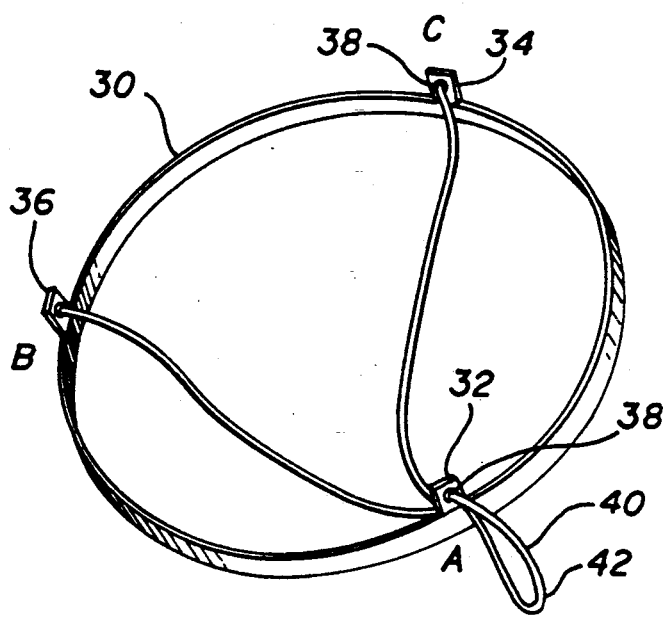
FIG. 1 is a perspective view of a first embodiment of the present invention shown in use with a flexible loop.

As shown in FIGS. 1, 2A and 2B, the basic structure of a first embodiment of the present invention comprises a loop 30 having three retainers 32, 34, 36, each retainer having an opening 38. The retainers 32, 36 and 34 are located in spaced-apart fashion along three separate points A, B and C, respectively, of the loop 30. A cable 40 having two ends is folded so that both ends are passed through the opening 38 of retainer 32. Each end of the cable 40 is then passed through the opening of a separate retainer 34 and 36 and tied thereto. A central portion of the cable 40 acts as a handle 42 for pulling the cable 40.

Retainers 36 and 34 perform the function of securing the two ends of the cable 40 to specific fixed points B and C, respectively. Thus, it is to be understood that retainers 36 and 34 are not necessary where the two ends of the cable 40 may be secured to points B and C in such a manner that such ends will be fixed at these specific points. Additionally, the opening 38 in retainer 32 may be provided in the loop 30 itself at the point A, so that the retainer 32 is also not necessary. It is also possible that the retainers be removable when the object supported by the loop is in use.

Alternatively, instead of providing one cable 40, it is also possible to provide two cables, each having one end tied to a separate retainer 34 and 36, and each having their second ends tied together to form the handle 42.

The loop 30 may be any flexible steel loop, plastic loop or other loop made of flexible material which is springy in nature and is capable of being coiled. The cable 40 may be made from wire, rope, thread or any other material, depending upon the environment in which it will be used. For example, when used in a harsh environment, such as with a bandsaw as shown in FIG. 3, the cable is preferably a strong cable capable of sustaining the heavy forces exerted by the bandsaw.

Referring to FIGS. 2A and 2B, the loop 30 may be folded and collapsed to a compact configuration by holding the loop 30 at point A and pulling the handle 42 of the cable 40 so that points B and C are pulled towards point A. At this stage, the springy nature of the loop 30 will cause the loop 30 to automatically twist and fold to form three concentric loops 48, 50 and 52 in such a manner that the points A, B and C come together at point A. Each concentric loop 48, 50 and 52 has a size smaller than the original expanded size of the loop 30. When the points A, B and C come together, the concentric loops 48, 50 and 52 overlie each other (see FIG. 2B). A stopper 54 is then slid along the cable 40 to where points A, B and C meet so as to lock the loop 30 in the collapsed configuration.

Referring to FIG. 3, the loop may take the form of a bandsaw 60. The bandsaw 60 is itself a flexible loop and may be folded and collapsed in the manner described above by pulling a cable 62 passed through a retainer 64. The retainer 64 may be used to fold and collapse the bandsaw 60 and may be removed when the bandsaw 60 is in use. Thus, this embodiment allows a bulky and dangerous bandsaw to be folded effectively and safely.

The flexible loop according to different embodiments of the present invention may be covered by a fabric material to form shades. Such shades may have one or more flexible loops covered by the fabric, such as the multi-loop shades shown and described in U.S. Pat. No. 4,815,784 to Zheng, entitled "Automobile Sunshield", the single-loop shades shown and described in U.S. Pat. No. 5,024,262 to Huang, entitled "Compactly Foldable Automobile Sunshade", and the multi-loop shade structures shown and described in co-pending Ser. No. 07/764,784 to Zheng, filed on Sep. 24, 1991, and entitled "Collapsible Shade Structure", all of which are incorporated herein by these references. These shades may take on any one of a number of configurations, such as the single-loop embodiments shown below in FIGS. 4-7, and the multi-loop embodiments shown in FIGS. 10-13.

For example, FIG. 4 illustrates a second embodiment 65 having a circular loop 66 covered by fabric material 68. An opening 70 is provided in the fabric 68 adjacent the loop 66 for passing both ends of a cable 72 therethrough to be tied to spaced-apart points 74 and 76 of the loop 66.

FIG. 5 illustrates a third embodiment 79 having a six-sided loop 80 covered by fabric material 82. An opening 84 is provided in the fabric 82 adjacent one side of the loop 80 for passing both ends of a cable 86 therethrough to be tied to points 88 and 90 on different sides of the loop 80.

FIG. 6 illustrates a fourth embodiment 93 having a five-sided loop 94 covered by fabric material 96. An opening 98 is provided in the fabric 96 adjacent one side of the loop 94 for passing both ends of a cable 100 therethrough to be tied to points 102 and 104 on different sides of the loop 94.

FIG. 7 illustrates a fifth embodiment 107 having a three-sided loop 108 covered by fabric material 110. An opening 112 is provided in the fabric 110 adjacent one side of the loop 108 for passing both ends of a cable 114 therethrough to be tied to points 116 and 118 on different sides of the loop 108.

Figure 8:
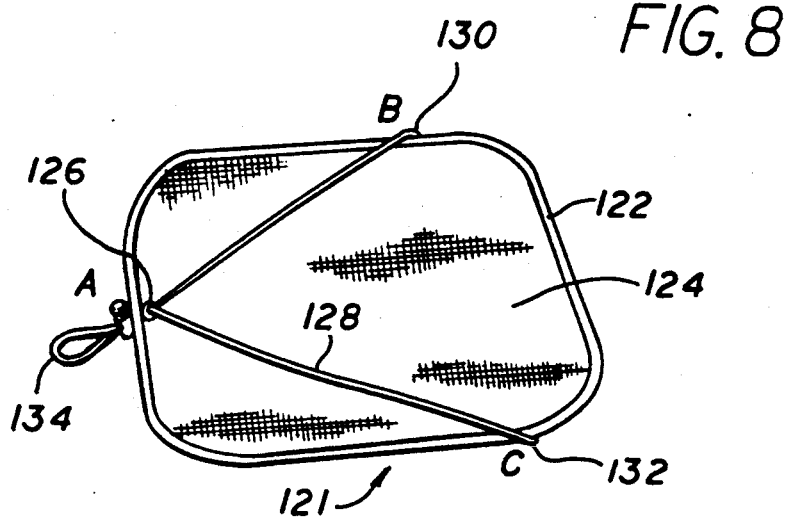
FIG. 8 is a perspective view of a sixth embodiment of the present invention having a four-sided loop covered by fabric material.
Figure 9A:
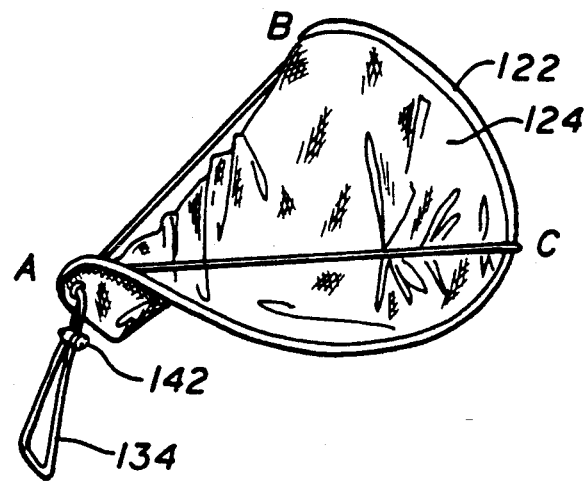
FIGS. 9A through 9F are perspective views illustrating how the sixth embodiment of FIG. 8 may be folded in accordance with a method of the present invention.
Figure 9B:
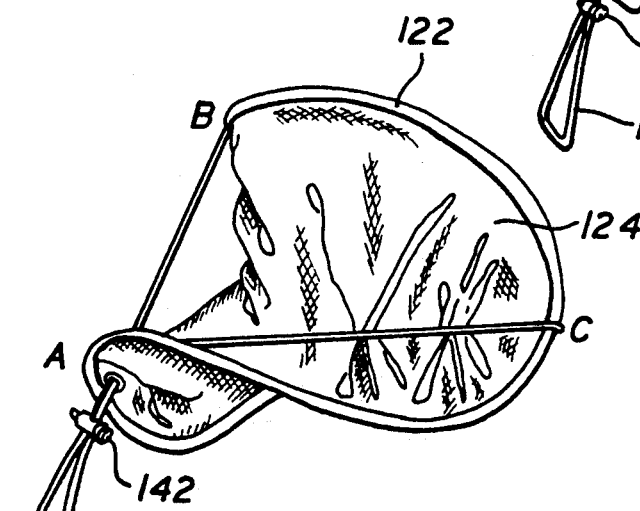
Figure 9C:
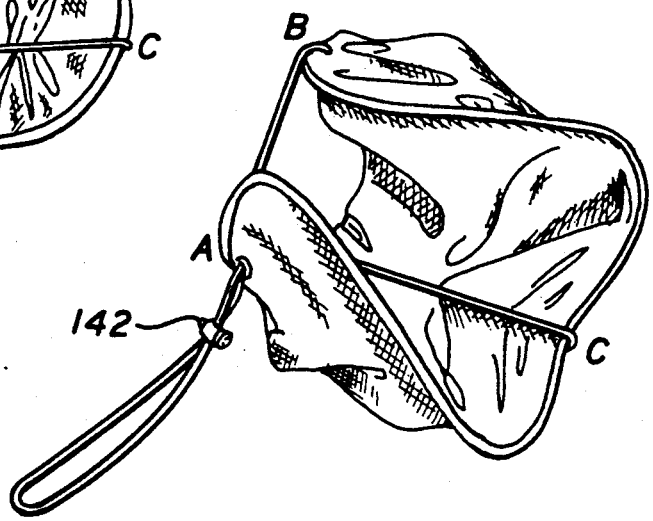
Figure 9D:
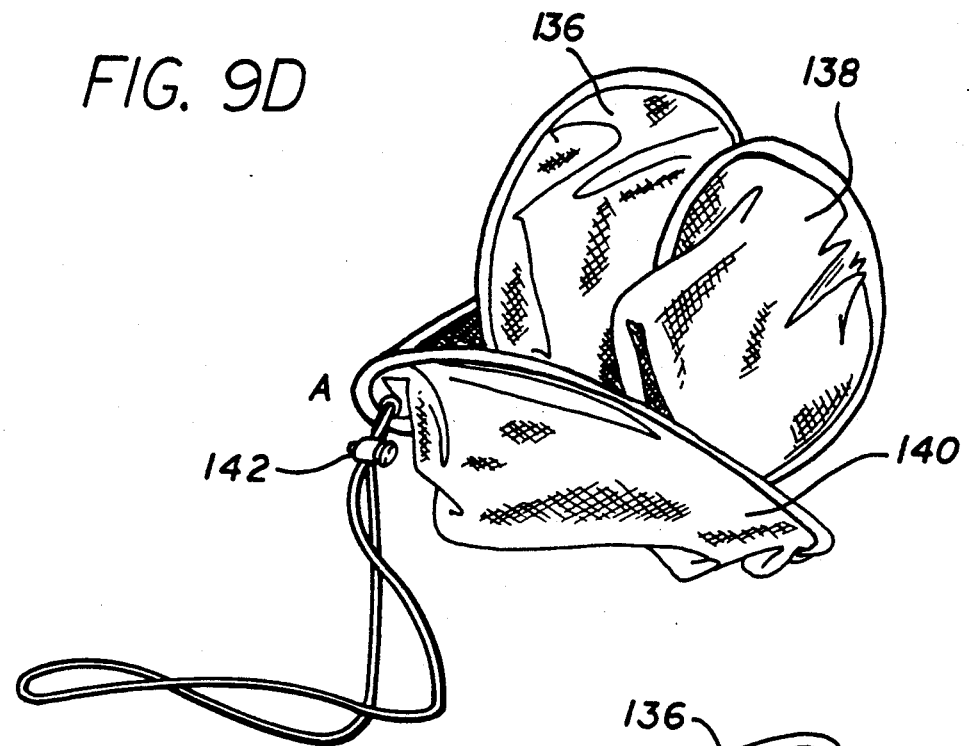
Figure 9E:
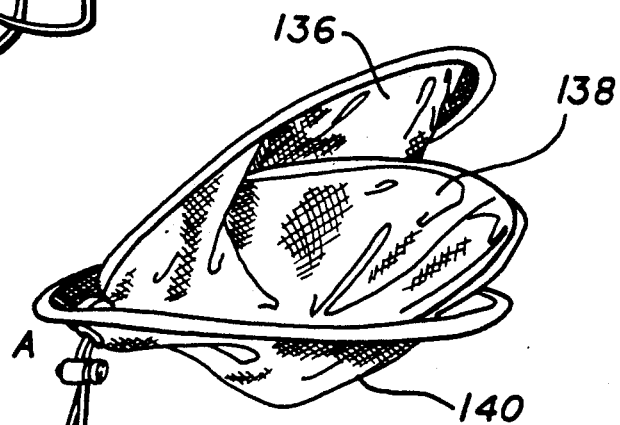
Figure 9F:
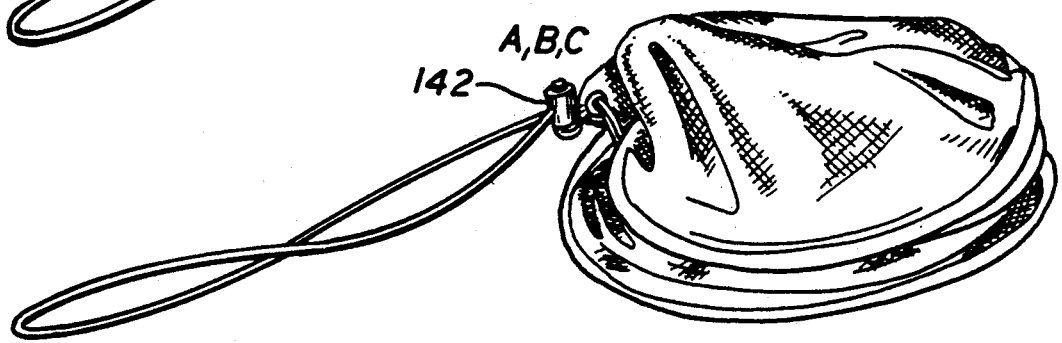

FIG. 8 illustrates a sixth embodiment 121 having a four-sided loop 122 covered by fabric material 124. An opening 126 representing point A is provided in the fabric 124 adjacent one side of the loop 122 for passing both ends of a cable 128 therethrough to be tied to points 130 and 132 (representing points B and C, respectively) on different sides of the loop 122. A handle 134 is formed at the central portion of the cable 128.

The embodiment 121 of FIG. 8 may be folded and collapsed in accordance with the method shown and described in FIGS. 9A through 9F. While holding onto the loop 122 at point A, the handle 134 is pulled to cause the points B and C to move towards point A. The flexible loop 122 automatically twists and folds into three concentric loops 136, 138 and 140 (see FIG. 9D) held together at point A, each concentric loop 136, 138 and 140 having a size smaller than the original expanded size of loop 122. The concentric loops 136, 138, 140 are then folded and collected to a collapsed structure having a size which is smaller than the size of the initial loop 122 (see FIGS. 9E and 9F). A stopper 142 is then slid to point A to lock the folded loop 122 in the collapsed state.

The single-loop embodiments of FIGS. 4 through 7 may be folded and collapsed in accordance with the method shown in connection with the embodiment of FIGS. 8 and 9A through 9F. The multi-loop embodiments of FIGS. 10-13, explained below, are folded and collapsed in a slightly different manner.

FIG. 10 illustrates a seventh embodiment 149 having two four-sided loops 150 and 152, each covered by fabric material 154. The loops 150, 152 are connected by interconnecting fabric 155, which may be the same material as fabric 154. The fabric 154 in each loop 150 and 152 is provided with separate openings 156 and 158, respectively, adjacent the sides of loops 150 and 152 that are connected to the interconnecting fabric 155, for passing both ends of a cable 160 therethrough to be tied to points 162 and 164 on different sides of the loop 152. A handle 166 is formed at the central portion of the cable 128. The two loops 150 and 152 may be folded by first folding the loop 150 upon the loop 152. Flaps 168 provided along the edges of loop 150 are then folded to engage "Velcro" pads 170 to hold the loops 150 and 152 firmly together. The handle 166 is then pulled to cause the combined loops 150 and 152 to be folded in accordance with the method described in connection with FIGS. 9B through 9F. A stopper 172 may be used to lock the folded loops 150 and 152 in the collapsed configuration.

FIG. 11 illustrates an eighth embodiment 175 having two four-sided loops 176 and 178, each covered by fabric material 180 and connected by interconnecting fabric 181, which may be the same material as fabric 180. The fabric 180 in each loop 176 and 178 is provided with separate openings 182 and 184, respectively, adjacent the sides of loops 176 and 178 that are connected to the interconnecting fabric 181. The interconnecting fabric 181 is also provided with an opening 185. Two cables 186 and 188 are used, with both ends of the cables 186 and 188 being passed through the opening 185. The two ends of one cable 186 are passed through the opening 182 and tied to points 190 and 192 on different sides of the loop 176. The two ends of the other cable 188 are passed through the opening 184 and tied to points 194 and 196 on different sides of the loop 178. Handles 198 and 200 are formed at the central portions of the cables 186 and 188, respectively. The two loops 176 and 178 may be folded by first folding one loop 176 upon the other loop 178. The handles 198 and 200 are then pulled to cause the combined loops 176, 178 to be folded and collapsed in accordance with the method described in connection with FIGS. 9B through 9F.

FIG. 12 illustrates a ninth embodiment 205 having two four-sided loops 206 and 208, each covered by fabric material 210 and connected by interconnecting fabric 211, which may be the same material as fabric 210. The fabric 210 in loop 206 is provided with openings 212 and 214 adjacent opposing sides of loop 206, while the fabric 210 in loop 208 is provided with openings 216 and 218 adjacent opposing sides of loop 208. The interconnecting fabric 211 is also provided with two openings 220 and 222. Two cables 224 and 226 are used. The two ends of one cable 224 are passed through the opening 220 and tied to openings 212 and 214. The two ends of the other cable 226 are passed through the opening 222 and tied to openings 216 and 218. Handles 228 and 230 are formed at the central portions of the cables 224 and 226, respectively. The two loops 206 and 208 may be folded by merely pulling the handles 228 and 230 to cause the loops 206, 208 to be collapsed and folded in accordance with the method described in connection with FIGS. 9B through 9F.

FIG. 13 illustrates a tenth embodiment 239 having three four-sided loops 240, 242 and 244, each covered by fabric material 246 and connected by interconnecting fabric portions 248 and 250, which may be the same material as fabric 246. The fabric 246 in loop 240 is provided with openings 252 and 254 on opposite corners of loop 240 and opening 253 on a side of loop 240 opposite openings 252 and 254. The fabric 246 in loop 242 is provided with openings 256 and 258 on opposing corners of loop 242 and opening 257 on a side of loop 242 opposite openings 256 and 258. The fabric 246 in loop 244 is provided with openings 260 and 262 on opposing sides of loop 244. The interconnecting portions 248 and 250 are each provided with one opening 264 and 266, respectively. Three cables 268, 270 and 272 are used. The two ends of a first cable 268 are passed through the openings 264 and 253 and tied to openings 252 and 254. The two ends of a second cable 270 are passed through the opening 257 and tied to openings 256 and 258. The two ends of a third cable 272 are passed through the opening 266 and tied to openings 260 and 262. Handles 274, 276 and 278 are formed at the central portions of the cables 268, 270 and 272, respectively. Each of the loops 240, 242 and 244 are folded separately by pulling the respective handles in accordance with FIGS. 9B through 9F. Stoppers 280, 282 and 284 may be used to lock the folded loops 240, 242, 244, respectively, in the collapsed configuration.

Figure 14A:
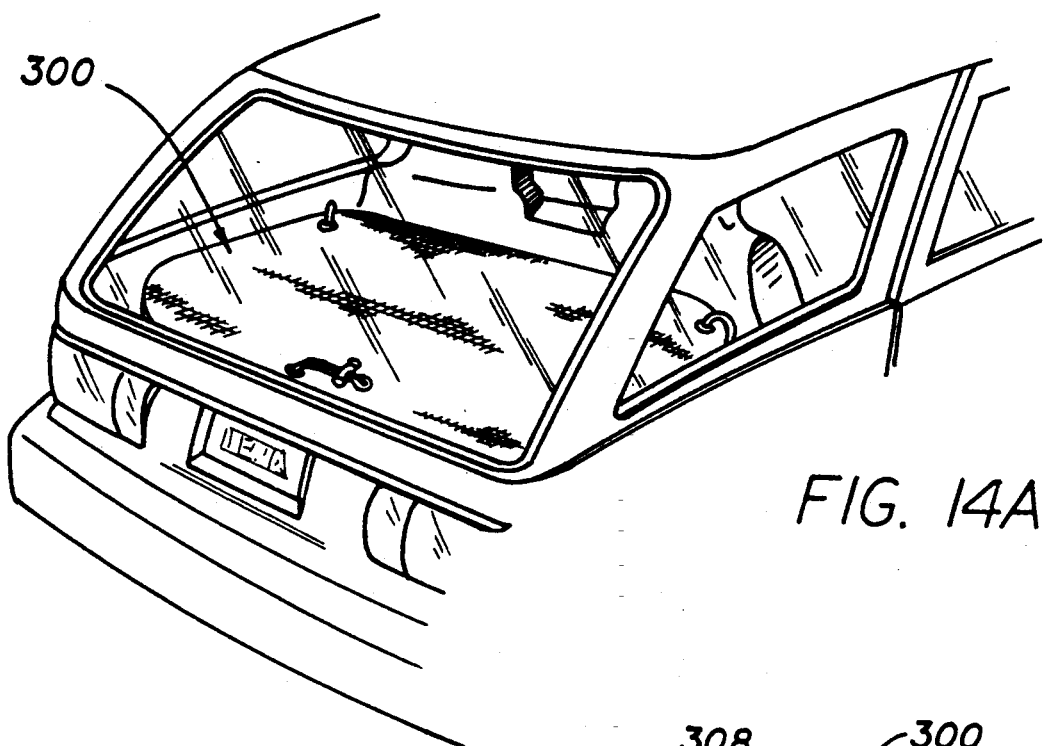
FIGS. 14A and 14B are perspective views of an actual application of the present invention in use with a station wagon trunk cover wrapped around a flexible loop.
Figure 14B:
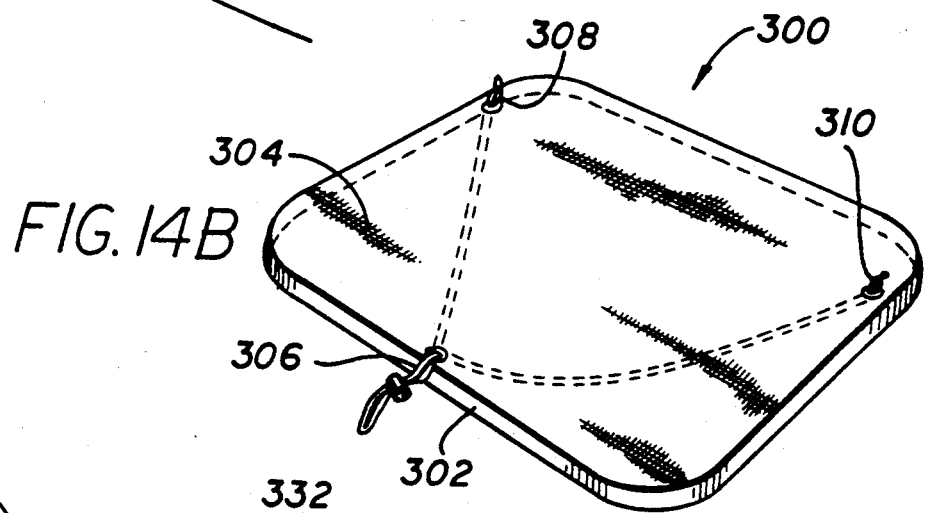

The method and apparatus of the present invention may be used in a wide variety of actual applications to fold larger objects into smaller compact configurations which are convenient for storage and transportation. Each of these objects incorporate a flexible loop which provides support to the object and which also defines the shape of the object. Examples include the bandsaw 60 of FIG. 3 and the shades of FIGS. 4–13 discussed hereinabove, wherein the respective loops define the actual shapes of these objects. Additionally, referring to FIGS. 14A and 14B, a station wagon trunk cover 300 may be made from a flexible loop 302 covered by fabric 304. The flexible loop 302 defines the overall shape of the cover 300. A cable 306 having two ends attached to spaced-apart points 308 and 310 may be pulled to cause the cover 300 to be folded and collapsed in accordance with a method of the present invention.

Figure 15:
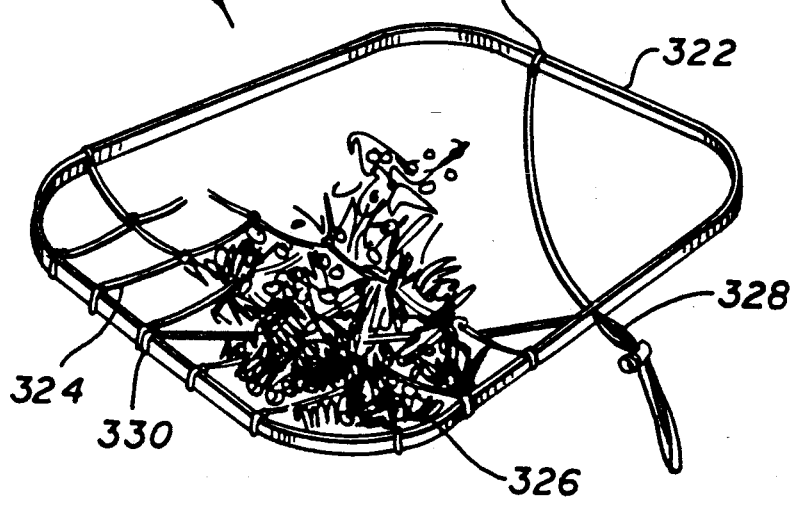
FIG. 15 is a perspective view of another actual application of the present invention in use with a military camouflage made from a flexible loop and covered by leaves.

As a further example, FIG. 15 illustrates a camouflage 320 which may be used in military applications. The camouflage 320 is made of a flexible loop 322 having an interweaved network of threads 324 for supporting grass or branches 326, the loop 322 defining the shape of the camouflage 320. A cable 328 having two ends attached to spaced-apart points 330 and 332 may be pulled to cause the camouflage 320 to be folded and collapsed in accordance with a method of the present invention.

The method and apparatus of the present invention may be also used in a wide variety of actual applications to close or fold openings which are defined by a flexible loop. For example, FIG. 16 illustrates a carry or tote bag 340 which has an opening 342 at one end. The opening 342 is defined by a flexible loop 344. The opening 342 may be closed by pulling a cable 346, causing the loop 344 to be folded and collapsed in accordance with a method of the present invention.

FIG. 17A illustrates a linen bag 360 which has an opening 362 at one end. The opening 362 is defined by a flexible loop 364. The opening 362 may be closed by pulling a cable 366 having two ends attached to spaced-apart points 368 and 370, causing the loop 364 to be folded and collapsed, as shown in FIG. 17B, in accordance with a method of the present invention.

In each of the above embodiments and applications of FIGS. 1–17, the ends or a portion of one or more cables are secured at or adjacent three spaced-apart fixed locations (i.e., three points) of each flexible loop. Thus, these loops may be folded and collapsed by pulling the handle of the cable to cause the three points to converge towards a central point to form three concentric but smaller loops. The concentric loops automatically twist and fold (due to the springy nature of the loop) about the central point to cause the concentric loops to overlie each other to obtain the desired compact configuration.

While the description above refers to particular applications with which the prevent invention may be used, it will be understood that the prevent invention may be used with many different applications without departing from the spirit thereof.

An object incorporating a flexible loop may also be folded and collapsed according to a method of the present invention where the ends or a portion of one or more cables are secured at or adjacent two spaced-apart fixed locations (i.e., two points) of each flexible loop. Such embodiments require the presence of a fabric material covering the loop to provide the necessary support for the cable during the folding and collapsing, and are shown and described in FIGS. 18, 19 and 20.

Figure 18A:
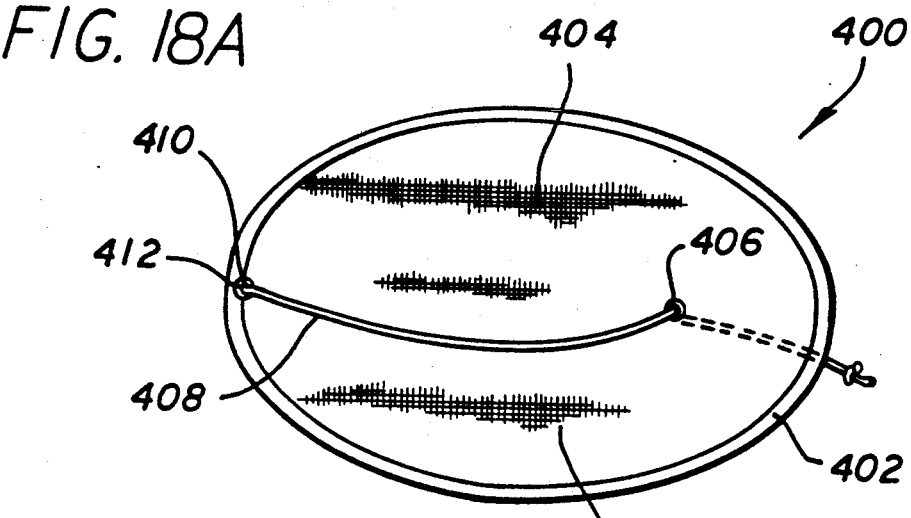
FIG. 18A is a front view of an eleventh embodiment of the present invention having an oval-shaped loop covered by fabric material in which the cable is passed through one opening in the fabric material and has one end tied to another opening in the fabric adjacent a point of the loop.
Figure 18B:
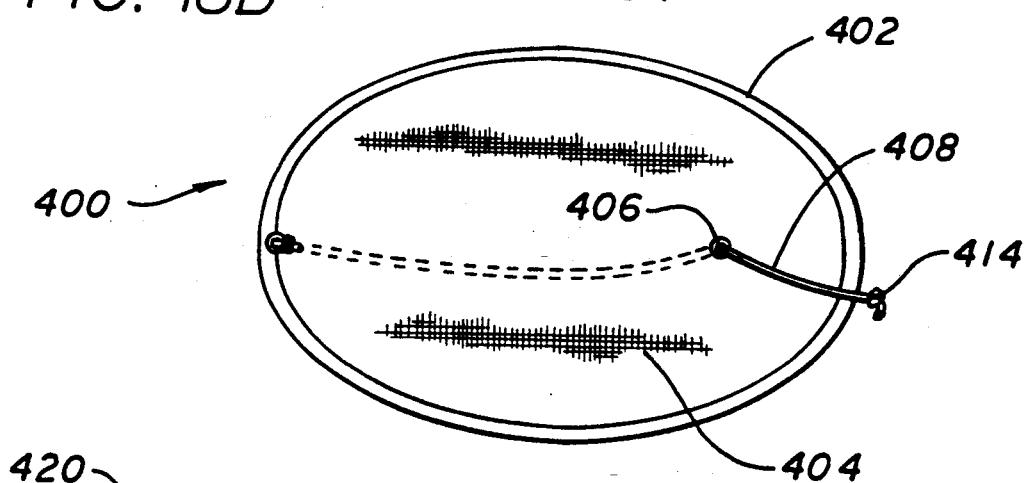
FIG. 18B is a rear view of the embodiment of FIG. 18A.

The front view of an eleventh embodiment 400 according to the present invention is shown in FIG. 18A. The eleventh embodiment 400 may take the form of a shade. The embodiment 400 has an oval-shaped loop 402 covered by fabric 404. An opening 406 is provided in the fabric 404 for allowing a first end 410 of a cable 408 to pass therethrough where it is tied to another opening 412 provided in the fabric 404 adjacent a point of the loop 402. A second end 414 of the cable 408 is knotted and extends from the rear of the embodiment 400 and acts as a handle, as shown in FIG. 18B. The embodiment 400 may be folded and collapsed in accordance with the method shown and described below in connection with FIGS. 19A through 19F below.

Figure 19A:
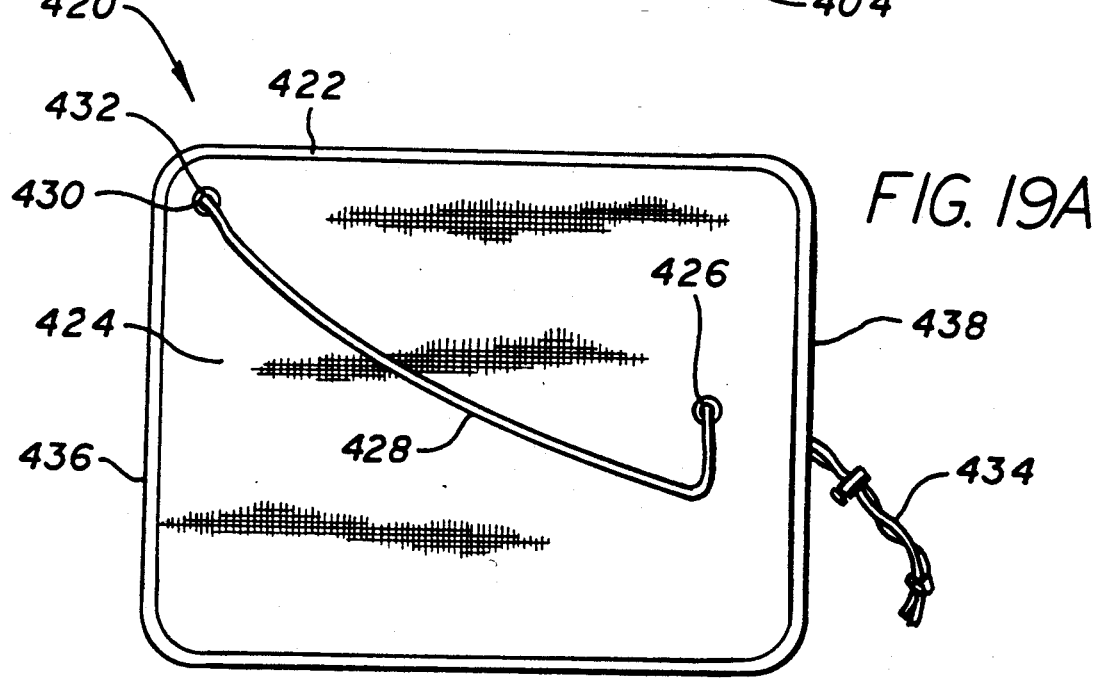
FIG. 19A is a front view of a twelfth embodiment of the present invention having a four-sided loop covered by fabric material in which the cable is passed through one opening in the fabric material and has one end tied to another opening in the fabric adjacent a corner of the loop.
Figure 19E:
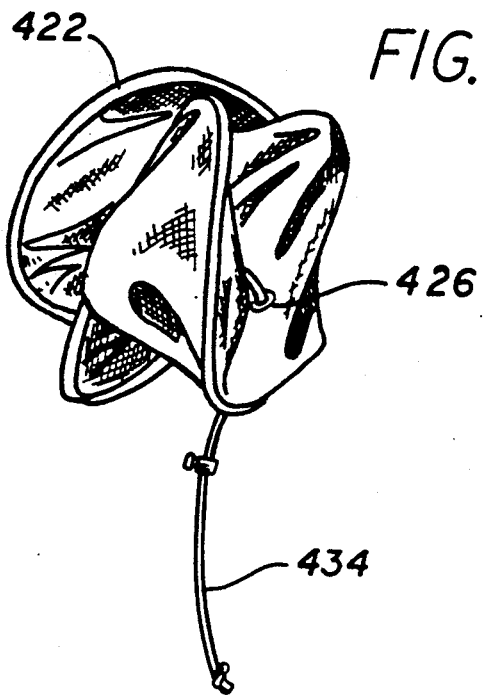
Figure 19F:
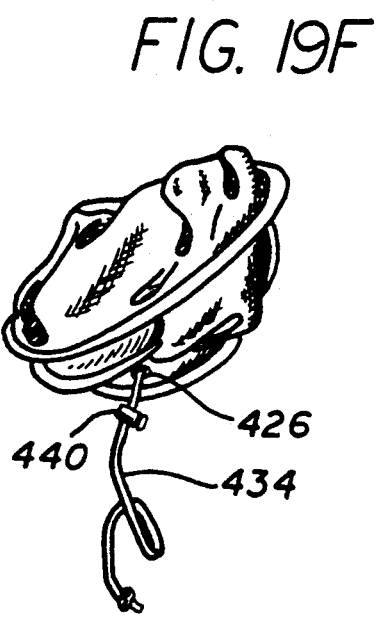

The front view of a twelfth embodiment 420 according to the present invention is shown in FIG. 19A. The twelfth embodiment 420 may also take the form of a shade. The embodiment 420 has a four-sided loop 422 covered by fabric 424. An opening 426 is provided in the fabric 424 for allowing a first end 430 of a cable 428 to pass therethrough where it is tied to another opening 432 provided in the fabric 424 adjacent one corner of the loop 422. A second end 434 of the cable 428 is knotted and extends from the rear of the embodiment 420 and acts as a handle.

The embodiment 420 of FIG. 19A may be folded and collapsed in accordance with the method shown and described in FIGS. 19B through 19F. While holding onto the fabric 424 at the opening 426, the handle 434 is pulled to cause the loop 422 to bend and the opposing sides 436 and 438 to fold towards each other (see FIGS. 19B and 19C) near the point of opening 426. The loop 422 automatically twists and folds into a plurality of concentric loops held together at the point of opening 426 (see FIGS. 19D and 19E). The concentric loops are then folded and collected to a collapsed structure having a size which is smaller than the size of the initial loop (see FIG. 19F). A stopper 440 is then slid to the point of opening 426 to lock the loop 422 in the collapsed configuration.

Figure 20A:
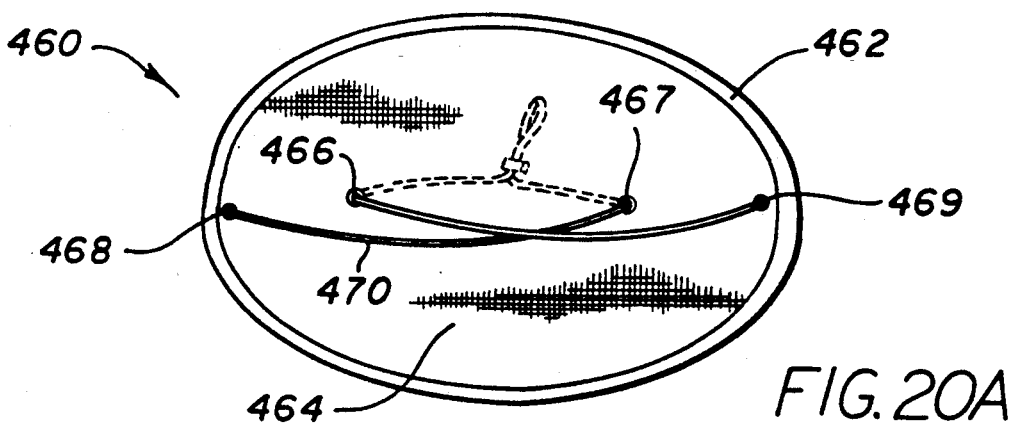
FIG. 20A is a front view of a thirteenth embodiment of the present invention having an oval-shaped loop covered by fabric material in which the cable has its opposing ends connected to two opposing points of the fabric adjacent opposing points of the loop and where the cable is passed through two openings in the fabric material.
Figure 20B:
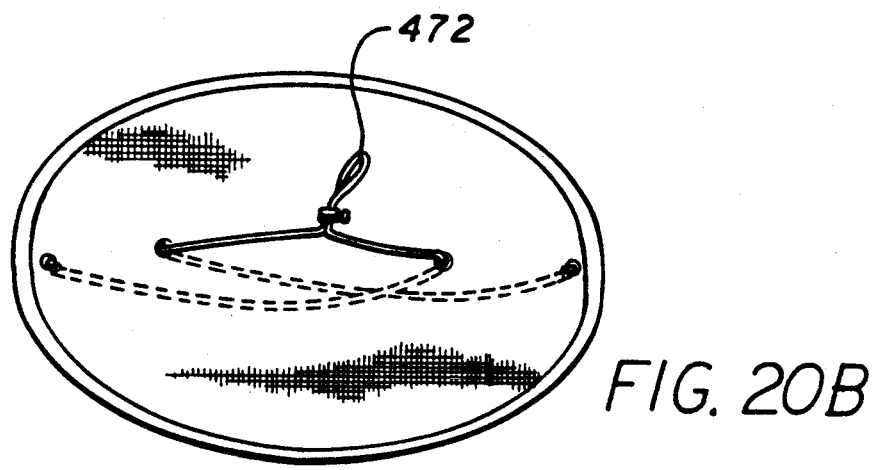
FIG. 20B is a rear view of the embodiment of FIG. 20A.

The front view of a thirteenth embodiment 460 according to the present invention is shown in FIG. 20A. The embodiment 460 has an oval-shaped loop 462 covered by fabric material 464 having two sets of two openings, a first pair of openings 466, 467 disposed in spaced-apart relation along the central portion of the fabric 464, and a second pair of openings 468, 469 disposed adjacent opposing ends of the loop 462. A first end of a cable 470 is passed through the opening 467 and tied to the opening 468, while a second end of cable 470 is passed through opening 466 and tied to opening 469. The central portion of the cable 470 forms a handle 472 which extends from the rear of the embodiment 460, as shown in FIG. 20B. The loop 462 may be folded and collapsed by pulling the handle 472 to cause opposite ends defined by the openings 468 and 469 to bend towards each other in a manner similar to that for embodiment 420 described in FIGS. 19B through 19F.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method for folding and collapsing an object incorporating a flexible loop, the loop substantially defining the configuration of the object, the loop further having an expanded state and a collapsed state, including the steps of:

providing a cable having a central portion and two ends;
   providing means operatively associated with a first point along the loop for defining an opening;
   securing a first end of the cable at a second point along the loop;
   securing a second end of the cable at a third point along the loop;
   passing the central portion of the cable through the opening to form a handle;
   holding the loop at the first point; and
   pulling the handle to urge the second and third points towards the first point such that the expanded loop twists and folds into the collapsed state in which the size of the expanded loop has been substantially reduced.

2. The method of claim 1, wherein three concentric loops are formed from the expanded loop about the first point when the second and third points are urged towards the first point, each concentric loop having a size smaller than that of the expanded loop.

3. The method of claim 2 wherein the three concentric loops twist and fold about the first point to cause the three concentric loops to overlie each other in a collapsed state.

4. The method of claim 1, further including the step of securing the collapsed loop in the collapsed state.

5. The method of claim 4 wherein the collapsed loop is secured in the collapsed orientation by sliding a stopper along the cable to the first point.

6. Apparatus for folding and collapsing an object incorporating a flexible loop, the loop substantially defining the configuration of the object, the loop further having an expanded state and a collapsed state which is substantially smaller in size than the expanded state, comprising:

means operatively associated with a first point along the loop for defining an opening;
   a cable having a central portion, a first end and a second end;
   means for securing the first end of the cable to a second point along the loop;
   means for securing the second end of the cable to a third point along the loop, the first, second and third points spaced-apart from each other along the loop; and
   a handle formed by passing the central portion of the cable through the opening.

7. Apparatus of claim 6 wherein the loop has at least three sides.

8. Apparatus of claim 6 wherein the loop is circular in shape.

9. Apparatus of claim 6, further comprising means for securing the collapsed loop in the collapsed state.

10. Apparatus of claim 6, wherein the object may be folded and collapsed by holding the loop at the first point and by pulling the handle to urge the second and third points towards the first point such that the expanded loop twists and folds into the collapsed state.

11. Apparatus of claim 10, wherein three concentric loops are formed from the expanded loop about the first point when the second and third points are urged towards the first point, each concentric loop having a size smaller than that of the expanded loop.

12. Apparatus of claim 11 wherein the three concentric loops twist and fold about the first point to cause the three concentric loops to overlie each other in the collapsed state.

13. Apparatus of claim 6 wherein the opening is provided in a retainer secured to the loop at the first point.

14. Apparatus for folding and collapsing a collapsible shade structure constructed of a flexible loop having an expanded state and a collapsed state and a fabric material substantially covering the loop, the fabric maintained to assume a particular configuration with the loop in the expanded state, comprising:

means operatively associated with a first point along the loop for defining an opening in the fabric;
   a cable having a central portion and two ends;
   means for securing a first end of the cable to a second point along the loop;
   means for securing a second end of the cable to a third point along the loop, the first, second and third points spaced-apart from each other along the loop; and
   a handle formed by passing the central portion of the cable through the opening.

15. Apparatus of claim 14 wherein the loop has at least three sides.

16. Apparatus of claim 14 wherein the loop is circular in shape.

17. Apparatus of claim 14, further comprising means for securing the collapsed loop in the collapsed state.

18. Apparatus of claim 14, wherein the shade structure may be folded and collapsed by holding the fabric at the first point and by pulling the handle to urge the second and third points towards the first point such that the expanded loop twists and folds into the collapsed state.

19. Apparatus of claim 18, wherein three concentric loops are formed from the expanded loop about the first point when the second and third points are urged towards the first point, each concentric loop having a size smaller than that of the expanded loop.

20. Apparatus of claim 19 wherein the three concentric loops twist and fold about the first point to cause the three concentric loops to overlie each other in the collapsed state.

21. Apparatus for folding and collapsing a collapsible shade structure constructed of a flexible loop having an expanded state and a collapsed state and a fabric material substantially covering the loop, the fabric maintained to assume a particular configuration with the loop in the expanded state, comprising:

means operatively associated with a first point along the loop for defining an opening in the fabric;

a cable having a central portion and two ends;

means for securing a first end of the cable to a second point along the loop, the first and second points spaced-apart from each other along the loop; and a second end of the cable passed through the opening to define a handle.

22. Apparatus of claim 21 wherein the loop has at least three sides.

23. Apparatus of claim 21 Wherein the loop is circular in shape.

24. Apparatus of claim 21, further comprising means for securing the collapsed loop in the collapsed state.

25. Apparatus of claim 21, wherein the shade structure may be folded and collapsed by holding the fabric at the first point and by pulling the handle to urge the first and second points towards the first point such that the expanded loop twists and folds into the collapsed state.

26. Apparatus of claim 25, wherein a plurality of concentric loops are formed from the expanded loop about the first point when the first and second points are urged towards the first point, each concentric loop having a size smaller than that of the expanded loop.

27. Apparatus of claim 26 wherein the concentric loops twist and fold about the first point to cause the concentric loops to overlie each other in the collapsed state.

* * * * *

UNITED STATES PATENT AND TRADEMARK OFFICE
CERTIFICATE OF CORRECTION

PATENT NO. : 5,213,147

DATED : May 25, 1993

INVENTOR(S) : Yu Zheng

It is certified that error appears in the above-identified patent and that said Letters Patent are hereby corrected as shown below:

On the title page: Item [22]

The filing date is December 4, 1991.

Signed and Sealed this

Twenty-fourth Day of May, 1994

Attest:

BRUCE LEHMAN

*Attesting Officer*   *Commissioner of Patents and Trademarks*